United States Patent
Ruff

(10) Patent No.: US 7,096,821 B2
(45) Date of Patent: Aug. 29, 2006

(54) CERAMIC ACCESSORIES FOR WILD BIRDS

(76) Inventor: Kenneth J. Ruff, 1518 Osage Trail, Jackson, MO (US) 63755

( * ) Notice: Subject to any disclaimer, the term of this patent is extended or adjusted under 35 U.S.C. 154(b) by 0 days.

(21) Appl. No.: 10/905,783

(22) Filed: Jan. 20, 2005

(65) Prior Publication Data

US 2005/0120967 A1    Jun. 9, 2005

Related U.S. Application Data

(62) Division of application No. 10/065,857, filed on Nov. 26, 2002, now Pat. No. 6,877,459.

(51) Int. Cl.
*A01K 1/01* (2006.01)
*A01K 5/00* (2006.01)
*A01K 39/00* (2006.01)
*A01K 61/002* (2006.01)

(52) U.S. Cl. .................. 119/51.01; 119/52.2; 119/57.8; 119/61.57; 119/428; 119/429

(58) Field of Classification Search ............... 119/433, 119/459, 435, 428, 429, 57.8, 57.9, 51.01, 119/52.1, 52.2, 61.1; D30/110, 125; 47/65–87
See application file for complete search history.

(56) References Cited

U.S. PATENT DOCUMENTS

| | | | |
|---|---|---|---|
| 1,158,968 A | 11/1915 | Benedict | |
| 1,495,900 A | 5/1924 | Foster | |
| 1,534,508 A | 4/1925 | Earp-Thomas | |
| D83,358 S | 2/1931 | Spankus | |
| D87,460 S * | 8/1932 | Cook | D30/110 |
| 1,894,406 A * | 1/1933 | Lenhart | 119/433 |
| D91,949 S | 4/1934 | Klie | |
| D117,053 S | 10/1939 | Straus | |
| 2,417,178 A * | 3/1947 | Ritter | 119/430 |
| 2,510,721 A | 6/1950 | Smith | |
| 2,715,386 A | 8/1955 | Jones | |
| 2,887,987 A | 5/1959 | Fitzgerald et al. | |
| 3,090,354 A * | 5/1963 | Merritt et al. | 119/52.4 |
| 5,207,180 A | 5/1993 | Graham | |
| 6,269,774 B1 * | 8/2001 | Stewart | 119/430 |
| 6,360,690 B1 * | 3/2002 | Canby | 119/52.2 |
| 6,427,629 B1 | 8/2002 | Lush | |
| 6,691,641 B1 | 2/2004 | Scalf | |

FOREIGN PATENT DOCUMENTS

GB        339680        12/1930

* cited by examiner

*Primary Examiner*—Peter M. Poon
*Assistant Examiner*—Joshua Michener
(74) *Attorney, Agent, or Firm*—Blackwell Sanders Peper Martin LLP

(57) ABSTRACT

An accessory for wild birds is formed from a plurality of ceramic clay flowerpots disposed in preselected relation to each other. The accessory includes a receptacle formed from a ceramic flowerpot. The receptacle has a first end and a second end and a continuous side wall of the receptacle extends between the first end and the second end of the receptacle. The continuous side wall defines a plurality of openings of preselected sizes disposed at preselected positions. At least one of a top and a bottom formed of a ceramic clay flowerpot are positioned coaxially and adjacent to at least one of the first end and the second end of the receptacle.

8 Claims, 18 Drawing Sheets

CERAMIC ACCESSORIES FOR WILD BIRDS

CROSS REFERENCE TO RELATED APPLICATION

This Application is a Divisional application of application Ser. No. 10/065,857 filed Nov. 26, 2002, now U.S. Pat. No. 6,877,459, of the same title, the disclosure of which is incorporated herein by reference.

BACKGROUND OF THE INVENTION

Field of the Invention

The present invention relates generally to the field of accessories, such as houses and feeders, for wild birds, and, more specifically, to birdhouses and bird feeders which are formed substantially entirely of conventional ceramic clay flowerpots.

Typically, houses and feeders are made from wood, although sometimes from other materials such as basketry, plastic or glass jars or bottles, metal sheets or cans, or various combinations of such materials. Due to prolonged exposure to weather, bird droppings, and physical damage caused by the beaks and claws of bird using the known accessories various problems were encountered with some of the above materials. These problems include decay such as corrosion or rot of the accessory per se because of contact with moisture from the weather and bird waste, as well as molding of bird feed or the accessory itself because of lack of drainage. Often, in known bird accessories, sufficient ventilation was lacking, making the item unsuitable for long term use, as necessary for raising chicks or storing feed. With some materials known in the art of wild bird accessories too much expense is involved in making the product for the product to be suitable for such outdoor uses. In other cases, portions of the structure of a birdhouse or feeder were made of metal or wood, which would corrode or rot.

Some very old patent art exists which shows the use of ceramic pottery for a portion of a birdhouse. These references include U.S. Des. 87, 460, U.S. Des. 117,053, U.S. Pat. Nos. 1,894,406 and 2,417,178. None of these birdhouses was made entirely of other items of pre-formed ceramic clay, but instead included substantial portions of other materials; e.g. metal or wood. None of them disclose the structural assembly of ceramic clay flower pots for forming an accessory for wild birds as disclosed herein.

SUMMARY OF THE INVENTION

Thus, the present wild bird accessories were developed with the above short-comings of the known art in mind, to provide birdhouses and bird feeders, which are formed substantially entirely from pre-existing products, more specifically, ceramic clay flowerpots of various sizes and shapes secured in carefully pre-selected relation to one another by known connectors and provided, when necessary, with drain holes and ventilation holes at predetermined points.

The key feature of the presently described and claimed wild bird accessories is that all major structural aspects of the accessories, top, bottom and sides, as well as internal features, except connectors, are entirely made of pre-formed terra cotta-type ceramic clay flowerpots. The particular constructions described and claimed herein are intended to provide improved drainage, airflow, convenience of use and economy of manufacture, all by use of pre-made products from another art, namely, ceramic flowerpots, which preferably have been treated (on all exterior surfaces, at least), to be impervious to moisture. Accordingly, in addition to all the above benefits, the new ceramic accessories for wild birds are aesthetically pleasing and, when left unfinished, blend nicely into the ambient environment. If preferred, they can also be painted or otherwise decorated for indoor or other ornamental use.

The flowerpot birdhouses described herein are designed for outdoor use as houses for various nesting birds. The size of the entry hole and the pottery components are selected to be consistent with the ideal requirements for specific bird families. Variations in hardware components permit painting and decorating for use as an accent piece for indoor use.

Consistent with most of the specific birdhouses described herein are the following features. A top of a ceramic birdhouse is formed from a ceramic clay flowerpot saucer, which provides an overhang above the hole, thus providing shade over the hole as well as keeping the rain out of the unit. The housing portion of the birdhouse is formed from a standard red clay flowerpot and has vent holes in the top to allow airflow through the inside of the house. The hole size and location (height from bottom of the inside floor) is consistent with ideal specifications for specific birds, as commonly known in the art. Pins (dowels) are used to hold the lower pot, which forms a floor in position and the floor has a hole in the bottom to allow moisture drainage. The lower pot (forming the floor) is also fitted within the main pot so as to allow a space between the two units, enhancing ventilation. The pins, which preferably hold the lower, floor pot to the main housing pot can be easily removed by pushing through the pot wall, for facile removal of the lower pot for cleaning as required. The connecting pin beneath the birdhouse opening can be formed with extra length, compared to the other connecting pins, to provide a perch, if desired. It is preferred that all clay components be treated for waterproofing, e.g., by dipping in silicone, to keep the unit impervious to moisture. All components are easily disassembled and re-assembled should the user desire, for cleaning between nesting seasons, for example.

A bird feeder formed of ceramic clay flowerpots is also described below, as an example of a feeder formed in accordance with the invention. The main structural portions of the feeders are all formed from clay pottery flowerpots and saucers for flowerpots. The feeders are designed to be used for specific types of birds, depending upon the bird types preferences for types of seed. Features generally common to the various conceived embodiments include the following features. The feeder top is formed from an inverted saucer to make a lid for the feeder, with a center hole that permits raising and lowering of the lid for filling and is held in place with a cable which connects the pot, feeder body, and the lid. A cable washer keeps moisture from running along the cable into the feed. Inside of the top of the flowerpot feed holder there is another saucer to keep the pot in a vertical position when the lid is raised to fill the feeder. This saucer has several large holes for easy filling and a small center hold which allows the cable to pass through. Inside the bottom of feed holder (body) is an inverted smaller flowerpot, to keep the seeds from coming in contact with the bottom of the feeder, thus preventing the feed (seeds) from getting wet and mildewing or molding.

The base of the feeder is a saucer that is sized to provide the right distance for the preferred birds, from the top of its rim (where the bird perches) to the seed hole, in the side of the feeder. The base saucer has holes in the center area to allow ventilation through the seed chamber. There are also holes in the outer area to provide drainage from rain. All of the pottery (pots and saucer) are held in vertical coaxial position by an elongated member, such as a galvanized cable, running through them. The cable is also useable as the hanger for the feeder. The feeding holes in the feed receptacle are designed in size and shape to be consistent with the type of seed for specific birds, i.e. thistle for finches, or sunflower seed for cardinals, titmice, etc. The size of the various flowerpot/saucer components can be varied to provide a feeder consistent with the type of feed (seeds) and bird to be fed by the subject feeder. As with the new clay birdhouses, the ceramic birdfeeder can be readily disassembled if desired, to clean out seed debris, for example.

In furtherance of the above objects and goals, the present invention is, briefly, an accessory for wild birds is formed from a plurality of ceramic clay flowerpots disposed in preselected relation to each other. The accessory includes a receptacle formed from a ceramic flowerpot. The receptacle has a first end and a second end and a continuous side wall of the receptacle extends between the first end and the second end of the receptacle. The continuous side wall defines a plurality of openings of preselected sizes disposed at preselected positions. At least one of a top and a bottom formed of a ceramic clay flowerpot are positioned coaxially and adjacent to at least one of the first end and the second end of the receptacle.

The invention is also, briefly, a method of making an accessory for wild birds, the method having the steps of providing a receptacle formed from a ceramic flowerpot, the receptacle having a first end and a second end and a continuous side wall of the receptacle extending between the first end and the second end of the receptacle, the continuous side wall defining a plurality of openings of preselected sizes disposed at preselected positions; providing at least one of a top and a bottom formed of a ceramic clay flowerpot; and positioning the at least one of a top and a bottom coaxially and adjacent to at least one of the first end and the second end of the receptacle.

These and other goals and advantages will be in part apparent and in part pointed out herein below.

BRIEF DESCRIPTION OF THE DRAWINGS

Throughout the drawings, like parts are indicated with like element numbers.

DETAILED DESCRIPTION

Figure 1:
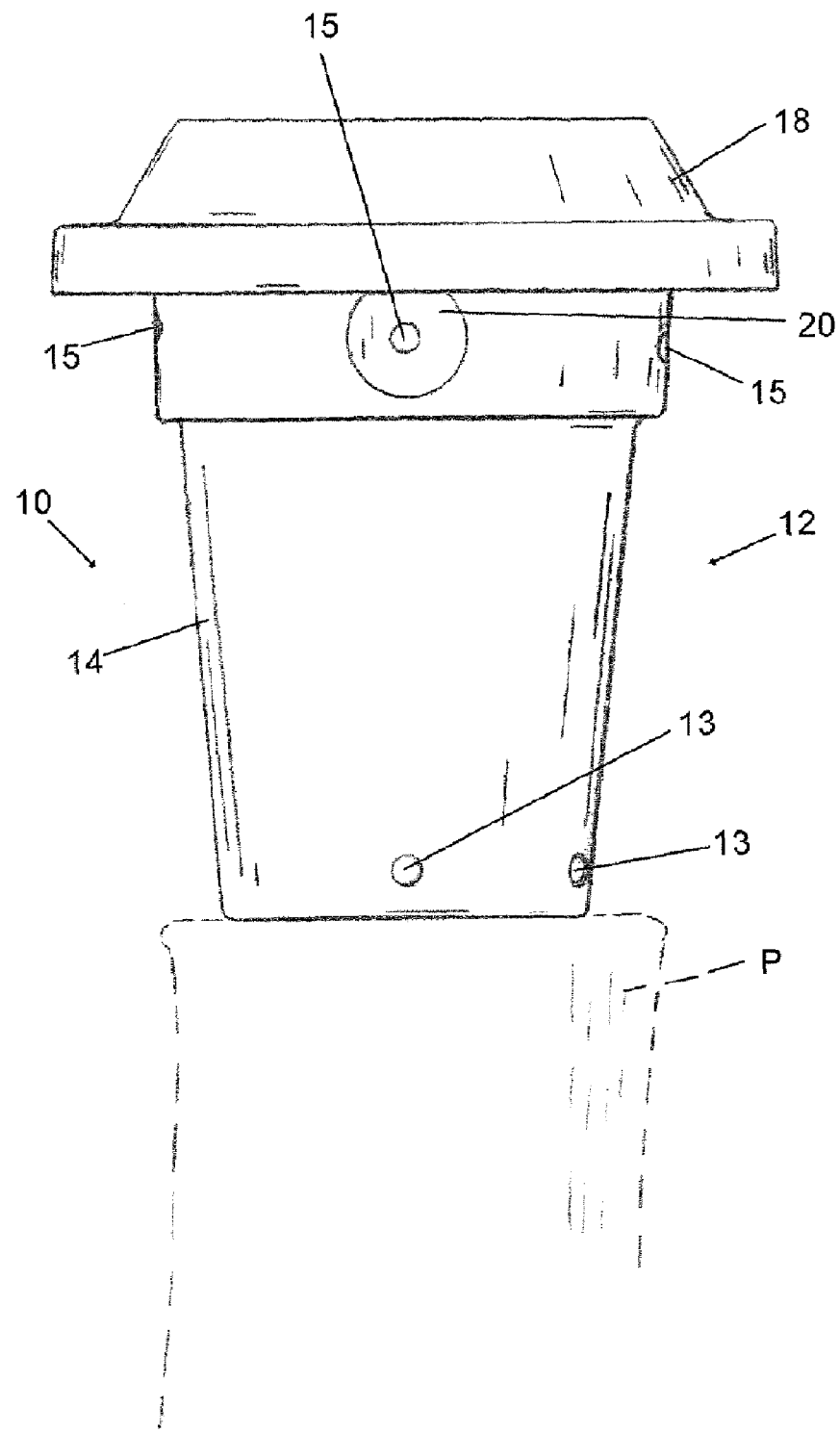
FIG. 1 is a front elevational view of a birdhouse constructed in accordance with the present invention.
Figure 2:
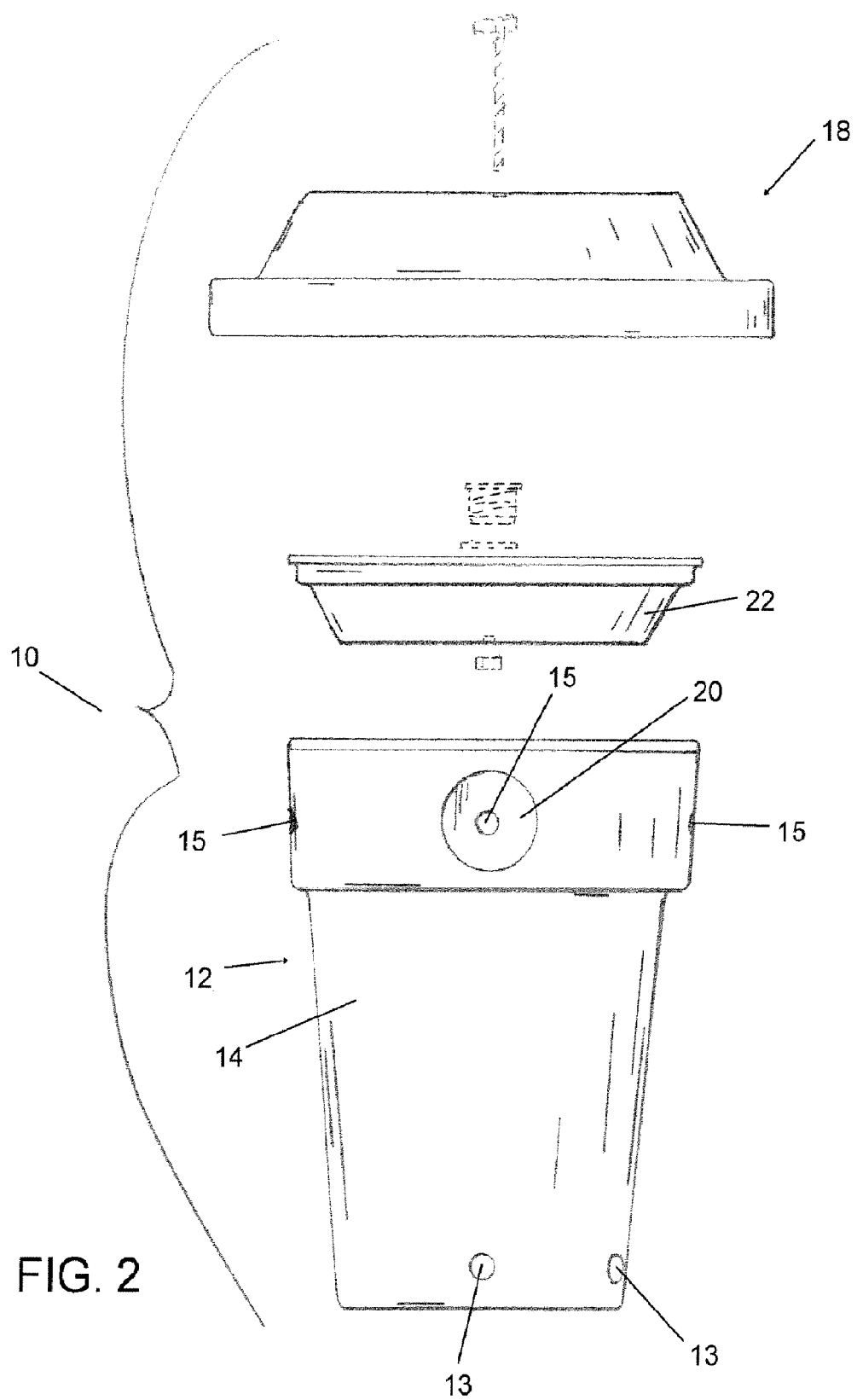
FIG. 2 is an exploded view of the birdhouse of FIG. 1.
Figure 3:
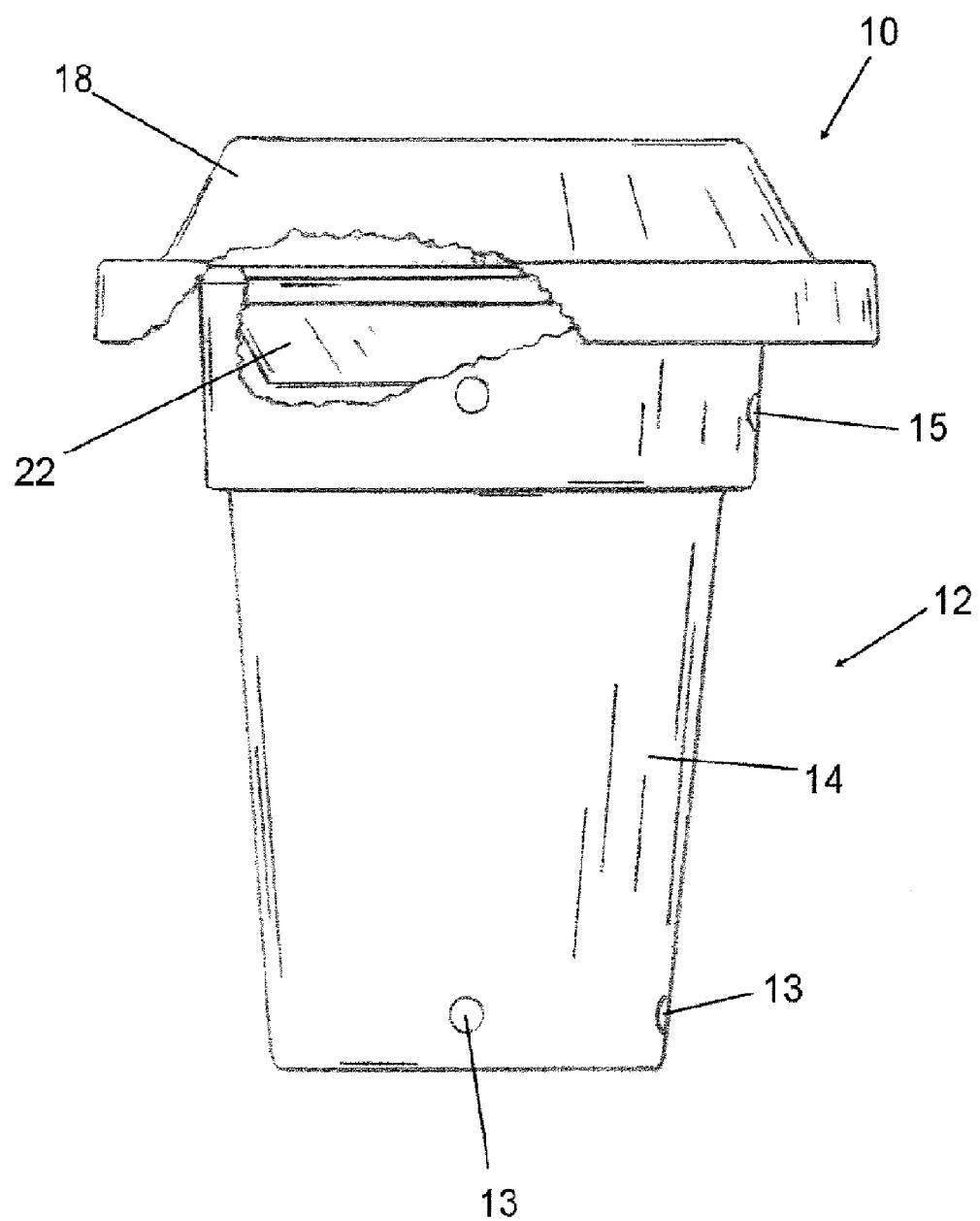
FIG. 3 is a back elevational view of the birdhouse of FIG. 1, partially broken away to illustrate the internal structure.

With reference to the several drawings, FIGS. 1–5 illustrate a free-standing embodiment of a birdhouse, generally designated 10, which is suitable for use supported on a surface, such as the top of a fence post, as indicated at P, in phantom, in FIG. 1. Birdhouse 10 is of a variety that is particularly well-suited for use by bluebirds, which frequent open, fielded areas, although it can be adapted in size for use by other birds as well. Birdhouse 10 does not have to be suspended on a wire or hook of any type, although it can be readily adapted for hanging, if desired, and is formed from a ceramic clay flowerpot and preferably two ceramic clay saucers, although one clay saucer can suffice, as will be described.

Figure 4:
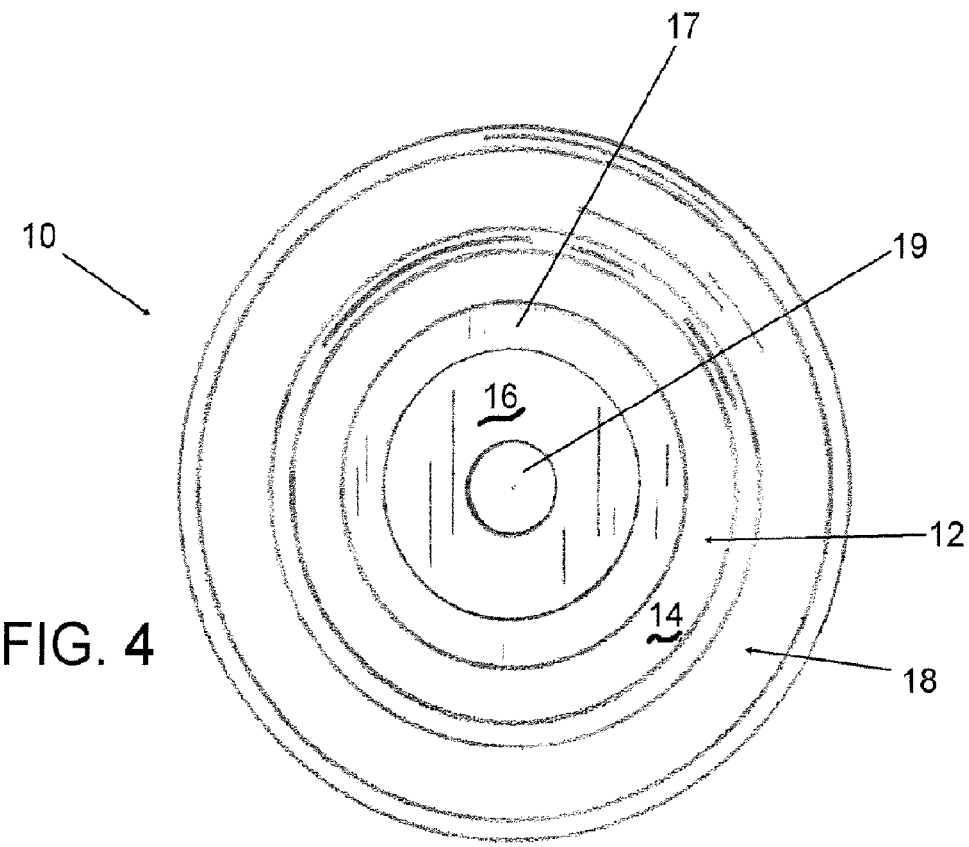
FIG. 4 is a bottom plan view of the birdhouse of FIG. 1.
Figure 5:
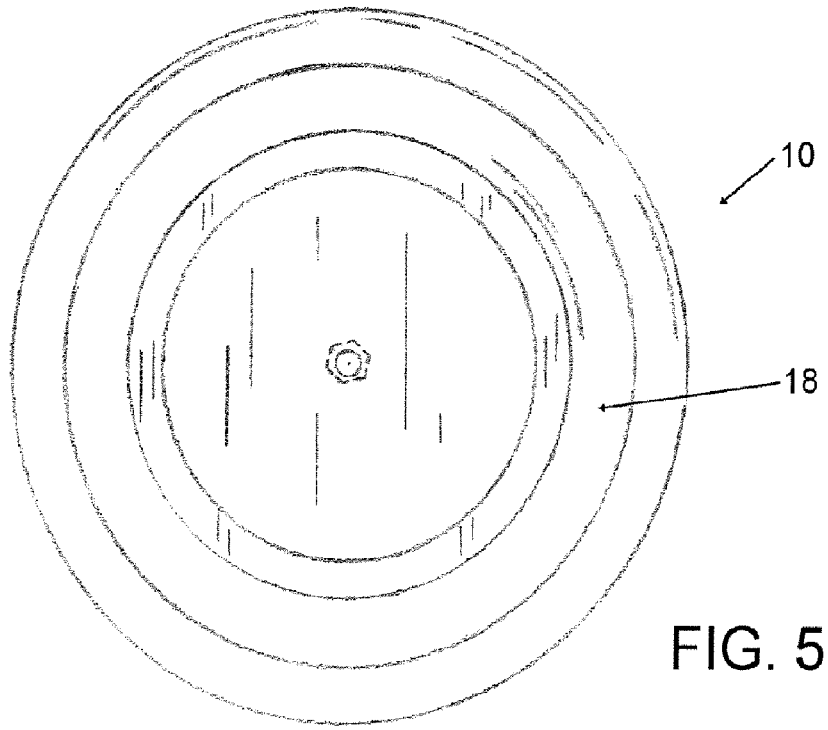
FIG. 5 is a top plan view of the birdhouse of FIG. 1.

Birdhouse 10 has a body or receptacle portion indicated at 12 which is formed from a flowerpot, such as what is commonly referred to in the industry as a "rose pot". Such a pot, with a six and one-half inch diameter at the top is ideal for the purpose of providing the major receptacle portion of the house for blue birds. Of course the dimensions of the receptacle and other parts of birdhouse 10 can be varied as desired to provide a house suited to the taste of other types of birds. Receptacle 12 has a generally cylindrical side wall 14 that tapers slightly downwardly and inwardly (i.e. a truncated, inverted cone) and terminates in a bottom surface 16, which is best illustrated in FIG. 4, and that has a substantially flat central portion defining an aperture 18 to permit drainage of any moisture which may accumulate in the receptacle. While the inherent weight of birdhouse 10 makes it fairly stable when sitting on a relatively flat surface, if desired, it can also be secured to the top of a fence post or other support surface by simple known connectors.

Birdhouse 10 has through-holes 13 are formed spacedly around the perimeter of wall 14 near its intersection with bottom 16. At least one and preferably three or four such holes, of about one cm diameter are preferred to enhance airflow within receptacle 12. Through-holes significantly smaller than one centimeter may become blocked with debris, and holes significantly larger can permit entrance into receptacle 12 of pests.

Airflow is further enhanced by provision of a plurality of holes 15 spaced apart from one another around the upper perimeter of receptacle 12. Holes 15 are similar in size to holes 13, and another opening 20 has a diameter of approximately four cm and is also positioned near the top of receptacle 12 for entrance and exit of wild birds.

In the embodiment illustrated, bottom 16 has an annular shoulder 17, coaxial to hole 19 which serves to keep the flat surface 16 spatially above any support surface. However, shoulder 17 can take other forms, for example a plurality of short feet, and similarly aperture 19 can be placed other than centrally in surface 16, as long as the drainage function is sufficiently obtained.

FIG. 1 shows an inverted flowerpot saucer that forms a "roof" or top 18 to birdhouse 10. In this embodiment top 18 is formed from a conventional eight and one-half inch diameter saucer for a flowerpot. Of course birdhouses 10 of other sizes can be provided for different birds and the roof can be sized correspondingly. In the preferred illustrated embodiment a smaller diameter saucer 20 (here with a diameter of about six and one quarter inches) is connected, right side up, inside of top 18 (formed by the larger saucer), by known connectors, as indicated in phantom, for example, in FIGS. 2 and 5. Because of irregularities in the edge surfaces of the receptacle pot and the saucer rim, saucer 20 serves to maintain top 18 in a position slightly spaced from the upper rim of receptacle 12, at the top of wall 14, so as to permit some enhancement of airflow within receptacle 12. Saucer 22 also serves to keep a depending edge of larger roof saucer 18 sufficiently above the access opening 20, to permit easy entrance and egress from birdhouse 10. While this arrangement is preferred, it is conceivable that saucer 20 can be omitted and house 10 will still function adequately.

FIGS. 6–9 illustrate another embodiment of a wild bird accessory, specifically a birdhouse, generally designated 30, formed from ceramic clay flowerpots. FIG. 7A schematically illustrates the internal assembled relationship of the flowerpots 34, 36 and 38 which form birdhouse 30.

Figure 8:
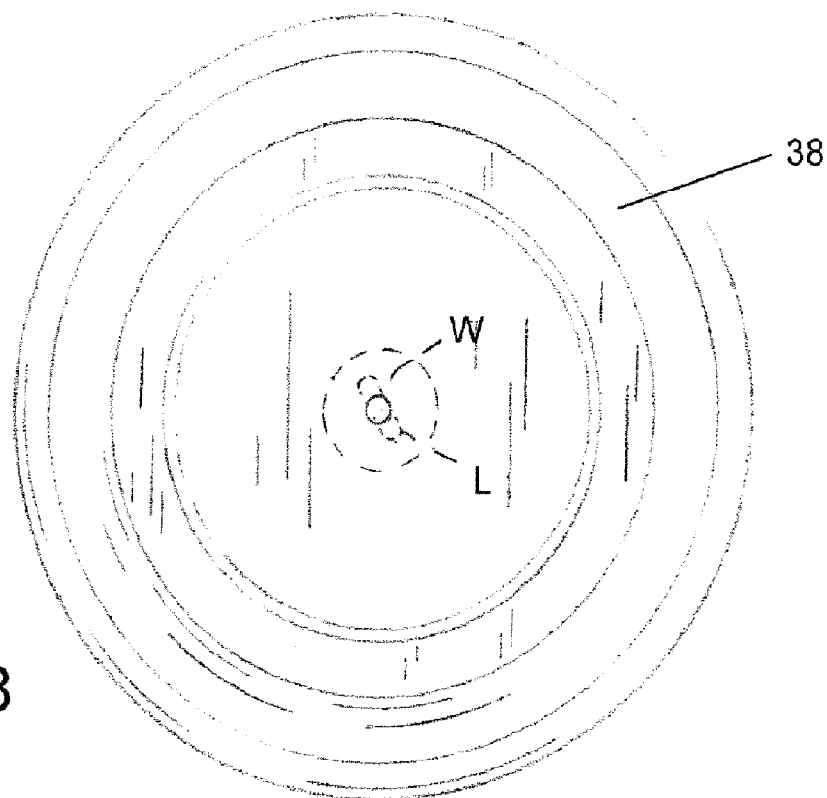
FIG. 8 is a top plan view of the birdhouse of FIG. 6.

Birdhouse 30 is intended to be suspended, for example, from a hook or a tree branch, not shown, via a loop or eyebolt, such as is indicated for example in phantom at L, at the top of the birdhouse. FIG. 8 illustrates in phantom a washer, which is preferably plastic, rubber, or other waterproof substance, and which is provided to inhibit the flow of water down the loop stem or any attaching cable into birdhouse 30.

Figure 6:
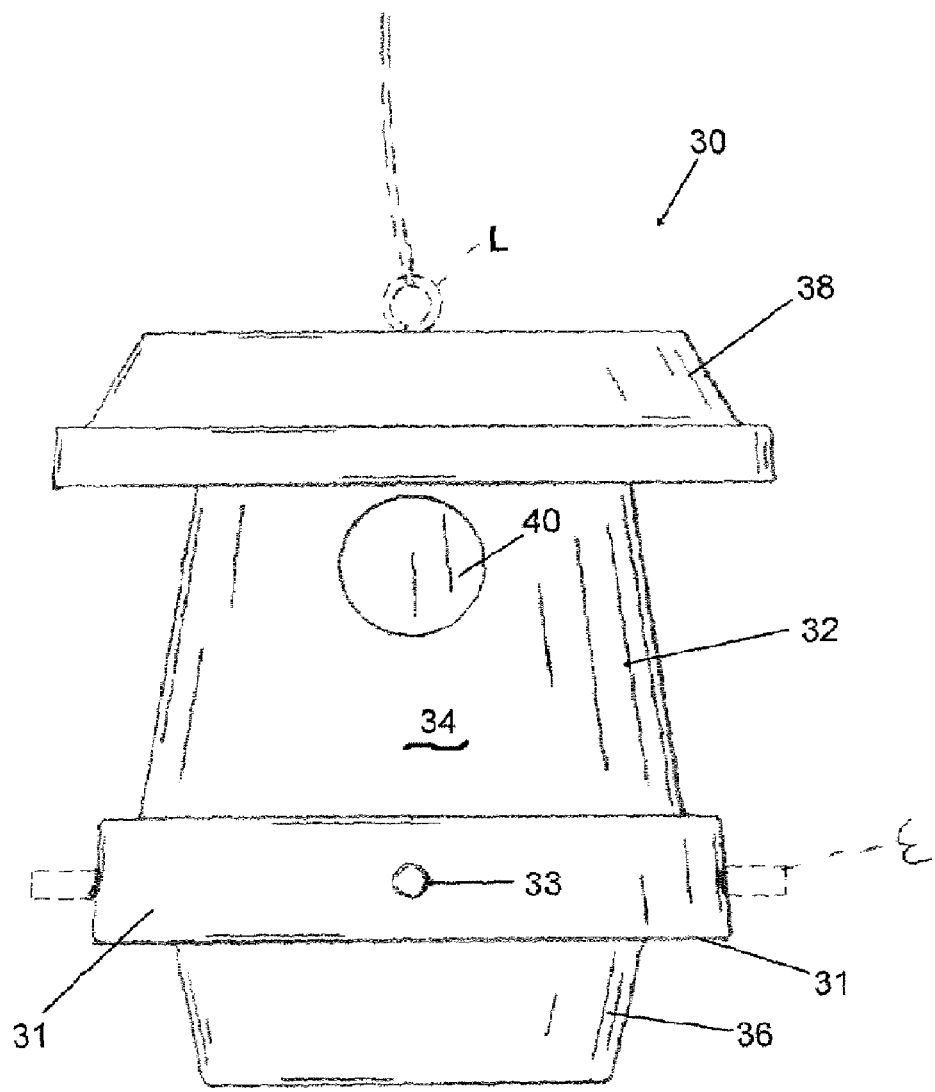
FIG. 6 is a front elevational view of a second embodiment of a birdhouse in accordance with the invention.
Figure 7:
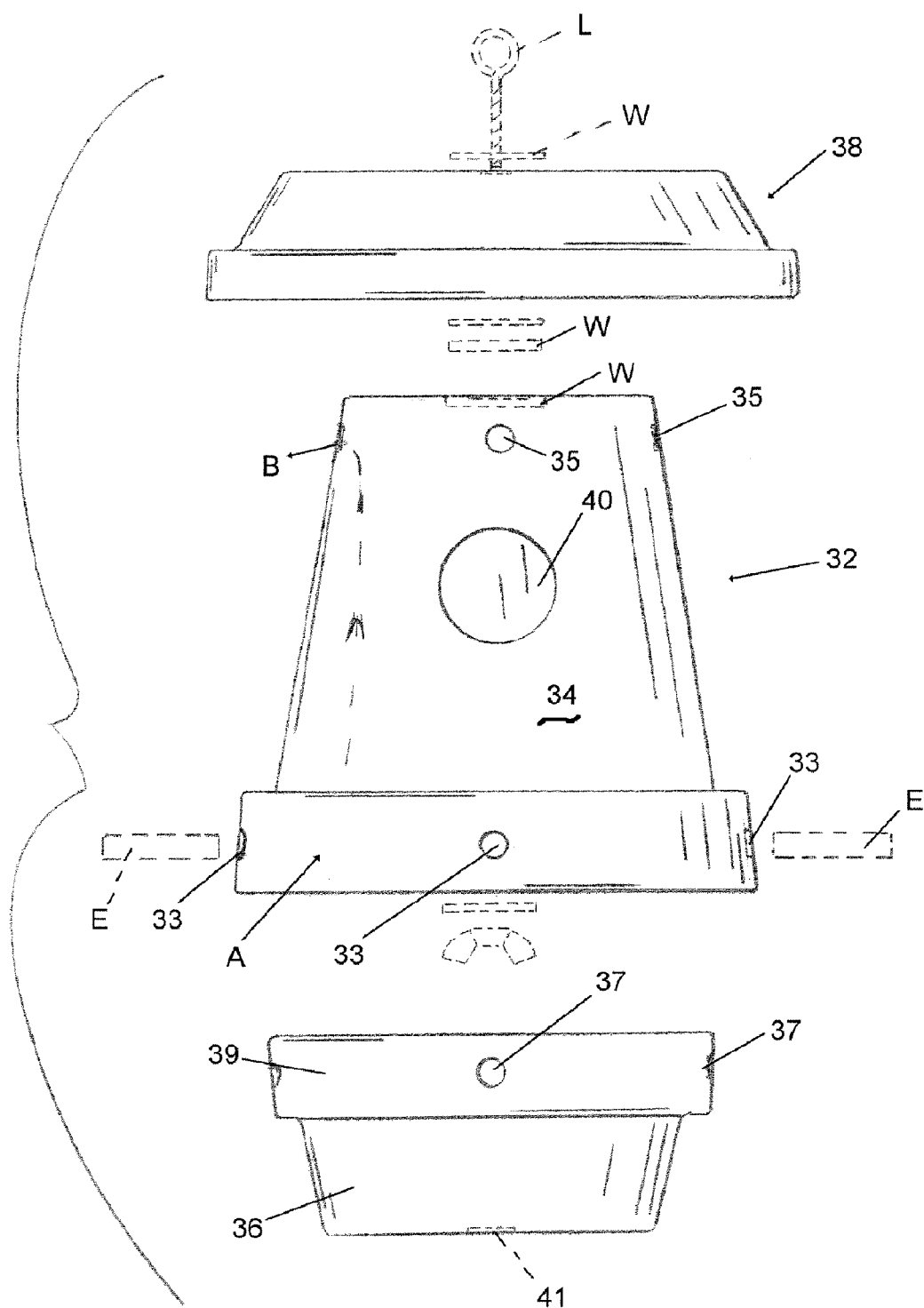
FIG. 7 is an exploded view of the birdhouse of FIG. 6.
Figure 7A:
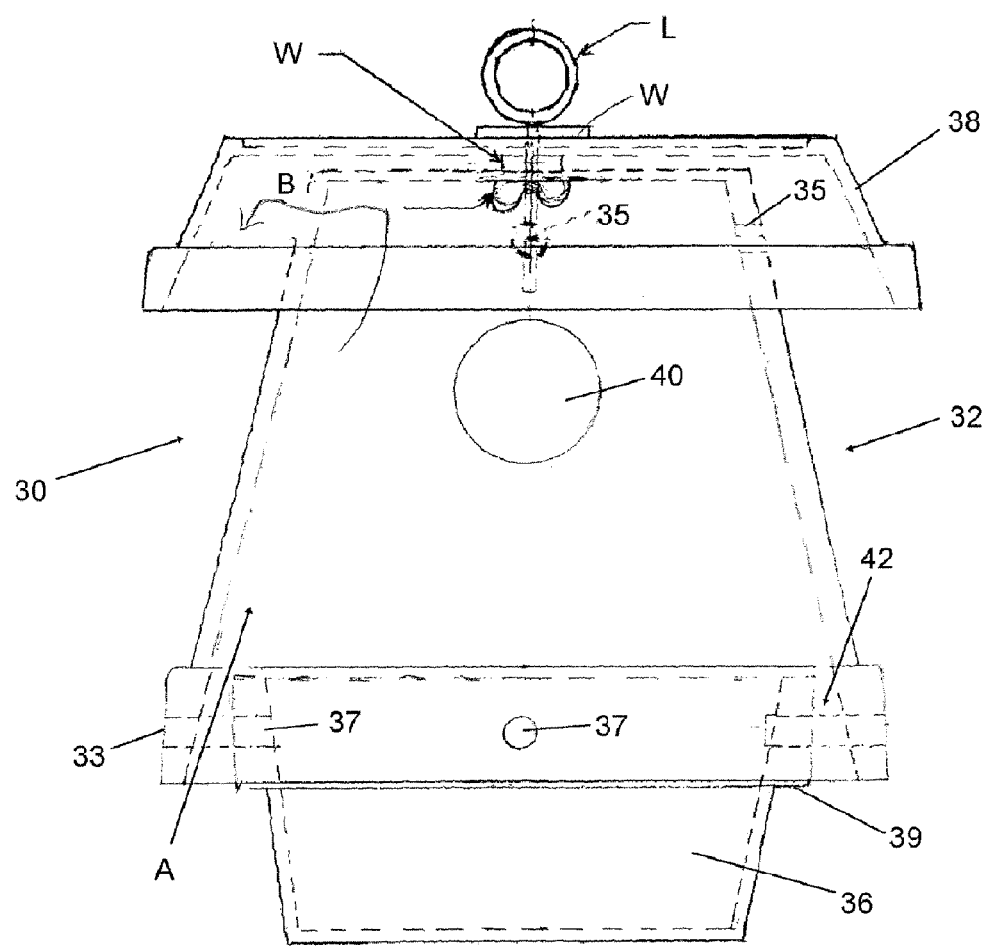
FIG. 7A is a schematic, enlarged view of the birdhouse of Fig., showing the internal relationship of the various elements thereof.

FIG. 7 illustrates in an exploded view the arrangement of flowerpots (as used herein "flower pots" can include ceramic clay pots of various shapes, flowerpot saucers, etc.) required to form birdhouse 30 as shown assembled in FIG. 6. The main receptacle pot 32 is, in this embodiment, a six and one quarter inch diameter standard red clay flower pot having a sloped, cylindrical side wall 34 and that is positioned upside down over a "cactus pot", forming the birdhouse base 36 such that the open perimeter 31 of receptacle pot 32 overlaps the exterior rim 39 of base pot 36. In the preferred form of this embodiment, the slope of wall 34 is 12 degrees.

A plurality of through-holes 33 is formed, spaced apart from one another (preferably uniformly) around perimeter 31 of receptacle pot 32 and serve to receive dowels or pegs, as indicated in phantom at E, which pass through holes 33 and connect receptacle pot 32 to base pot 36 by being received in aligned holes 37 formed around the rim 39 (see FIG. 7) of base pot 36. One especially preferred type of peg E is known as a plastic expansion plug, sized for example, at about 0.29 inch diameter (for holes of about one quarter inch diameter) and about one inch long, or as is suitable to selectively releasably secure the pots together. When desired, pegs E can be removed from their respective paired holes 33, 37 for facile removal of bottom 36 for cleaning out of old nesting material.

An entrance/egress hole 40 is formed in the side wall 34 of receptacle pot 32 and is sized appropriately for the particular bird desired to be attracted to house 30. As a useful example, in this embodiment, a hole of about one and one fourth inch diameter will suit the taste of many types of birds. Although it is not required, it is preferred that hole 40 be disposed above one of the perimeter connection holes 33, so that, if desired, a perch can be provided by simply inserting a longer dowel E than is necessary for simple connection of the two pots. Certain birds prefer to have a perch just outside of the house entrance 40. Ventilation holes, such as those indicated at 35 are also provided, spacedly around the base of pot 32 (now at the top of the house) so that air and excess heat can readily flow out of holes 35. It should be noted that imperfections in the rims and perimeters of pots 32 and 36 prevent a fit that is air tight, so that air can flow up from the bottom of the house, to the top thereof, as indicated at arrows A and B in FIG. 7. This air flow is ensured by selecting a base pot and a receptacle pot which are appropriately sized, relative to each other, so that when dowels E is inserted through both pots a sufficient air space remains between the adjacent rims.

Figure 9:
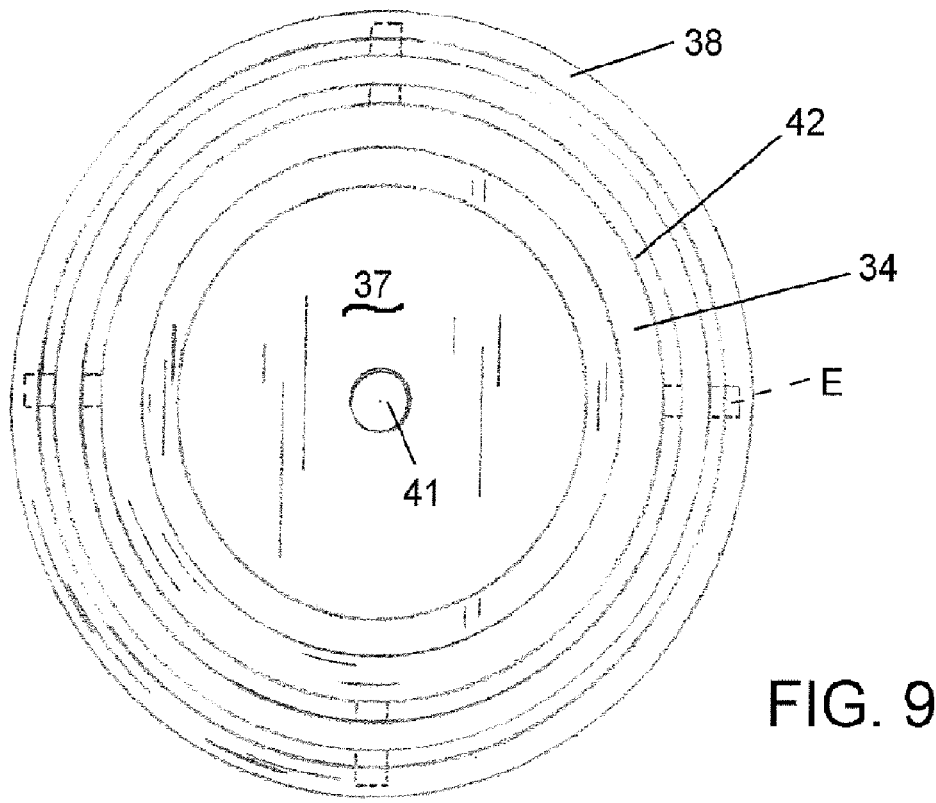
FIG. 9 is a bottom plan view of the birdhouse of FIG. 6.

FIG. 9 shows the bottom of the assembled birdhouse 30, illustrating the connecting dowels E in place to attach post 32 and 36, and a drain hole 39 in floor 37 of cactus pot 36. Drain hole 39 is commonly provided in the ordinary structure of a cactus type ceramic saucer, and thus may not require any additional effort to manufacture when the pot is used to form house 30. Also seen in FIG. 9 is an annular space 39 which is defined between the concentrically disposed rims 31 (of receptacle pot 32) and 39 (of floor pot 36). The relative positioning of pots 32 and 39, so as to provide annular space 42, is maintained by pegs E and permits air flow between the two pot rims, up into the receptacle nesting chamber, as indicated by arrow A in FIG. 7.

The roof of house 30 is formed by another ceramic clay saucer style flowerpot, such as that indicated at 38 in FIGS. 6–9. A six and one half inch red clay saucer is ideal for this use. Saucer 38 is inverted in its normal use position for the roof of birdhouse 30 and is connected to the bottom of receptacle pot 32 (at the top of house 30) by conventional connectors, such as the washers, screw, and wing nut arrangement seen in phantom in FIG. 7, for example. Other known connectors are conceived that will suffice, as long as the three pots are well secured to each other in the arrangement shown, with base pot 36 positioned upright and pots 32 and 38 inverted coaxially thereover, to supply a dry shelter, well sized for a bird house and provided with sufficient ventilation via access hole 40 and ventilation holes 35. As with the other embodiments of wild bird accessories illustrated and described herein, the dimensions of a particular embodiment can change, as long as all the main structural, clay pot elements of a particular embodiment have corresponding changes in size.

Figure 10:
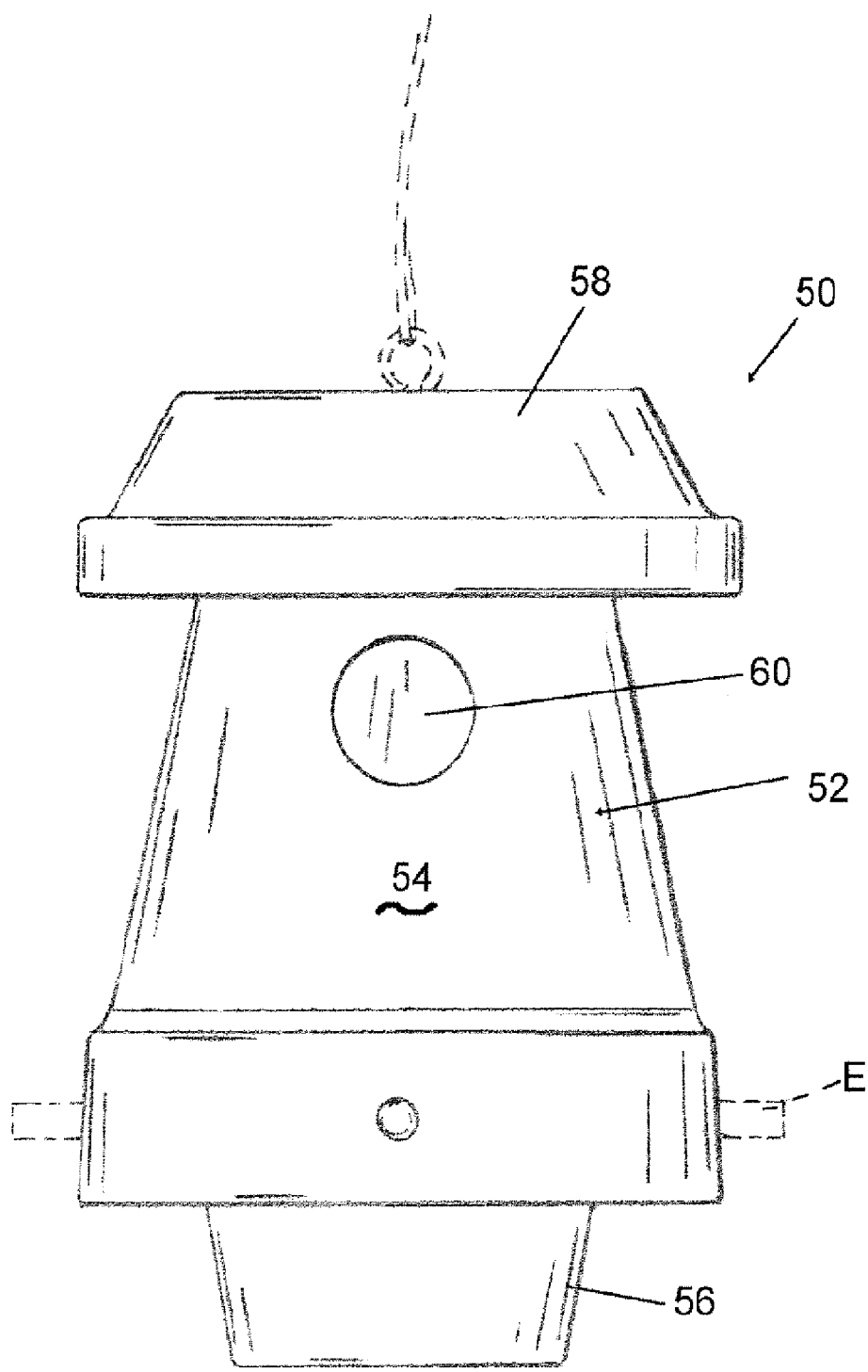
FIG. 10 is a front elevational view of a third embodiment of a birdhouse in accordance with the invention.
Figure 11:
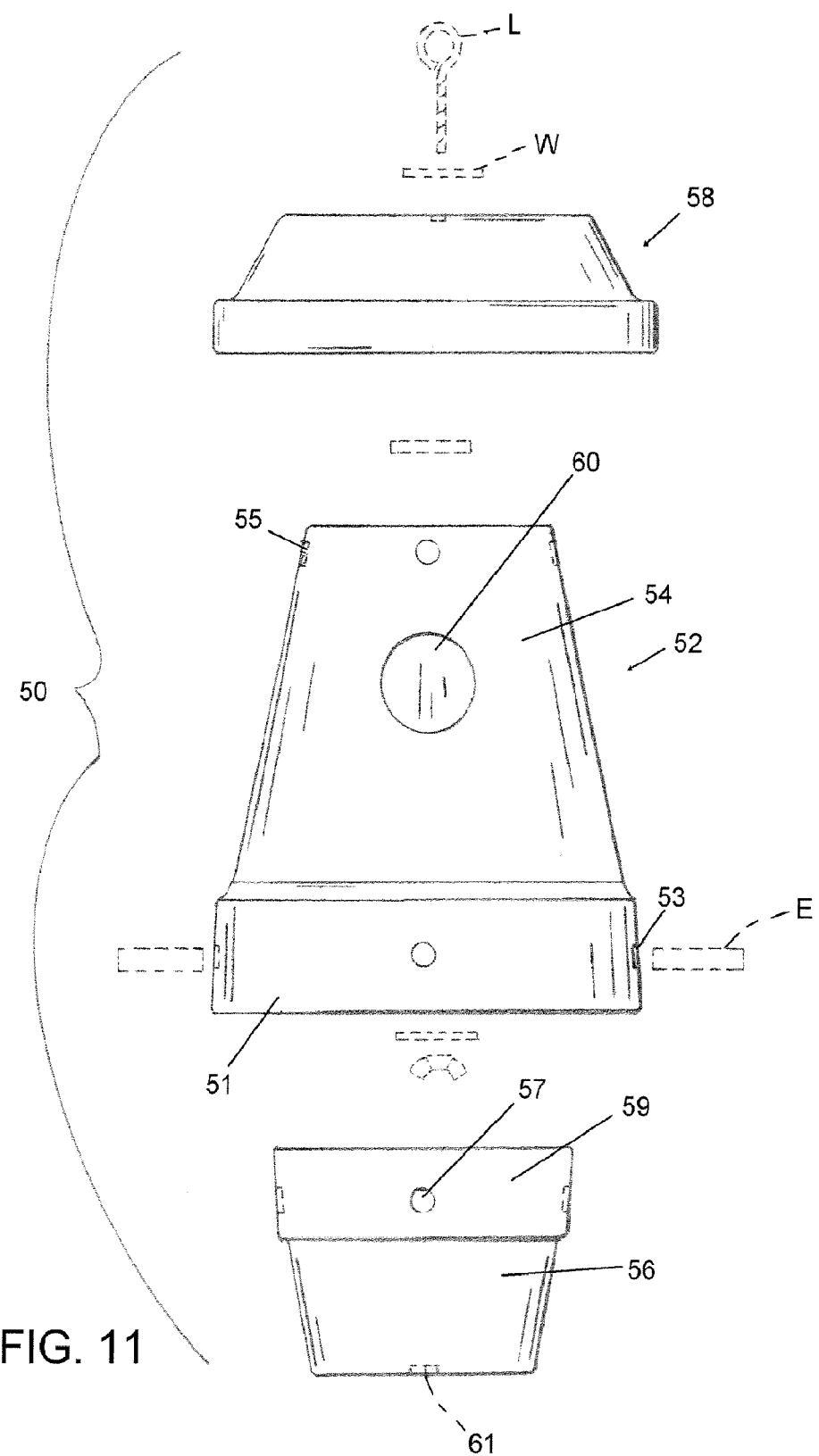
FIG. 11 is an exploded view of the birdhouse of FIG. 10.
Figure 12:
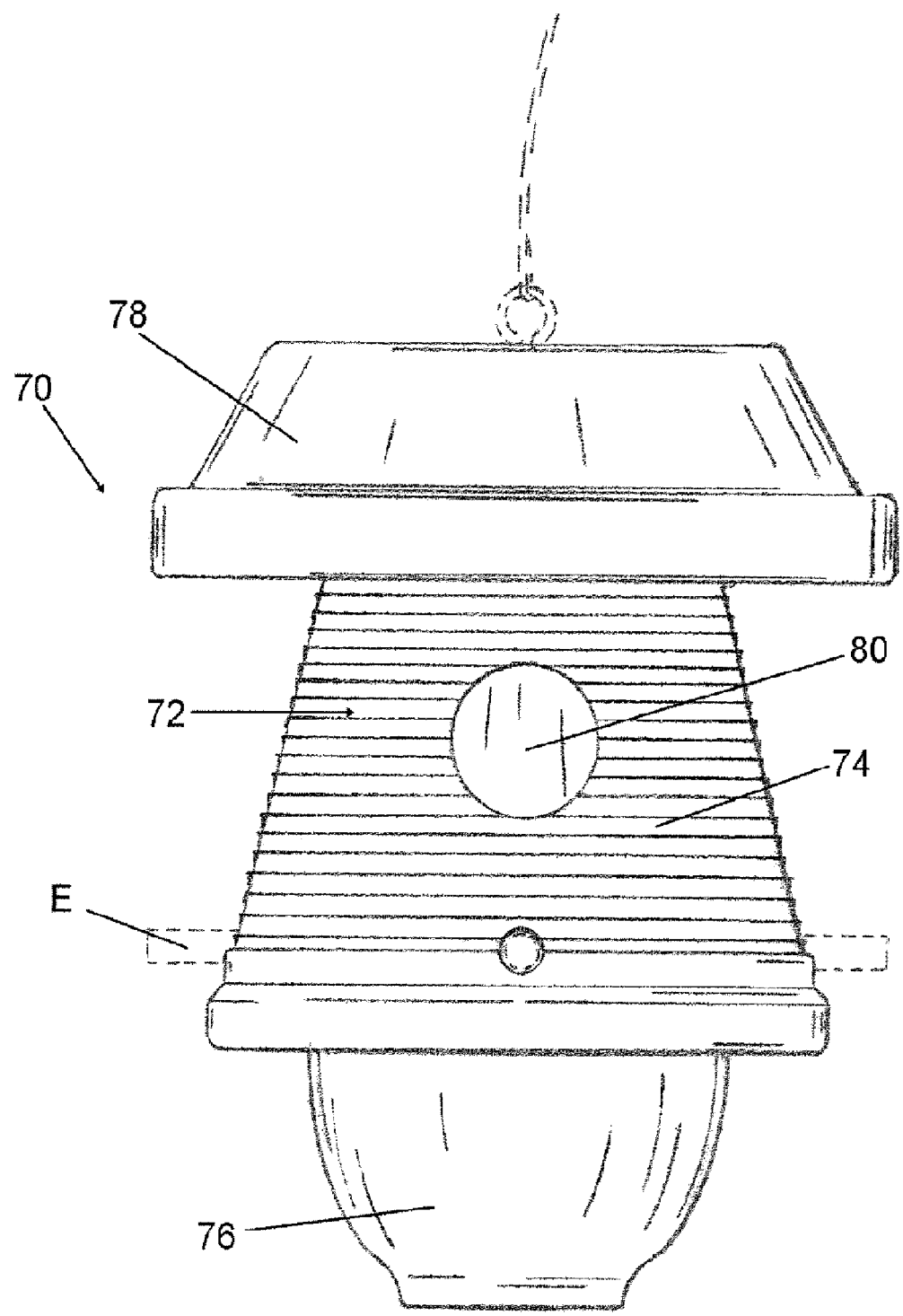
FIG. 12 is a front elevational view of a fourth embodiment of a birdhouse in accordance with the invention.
Figure 13:
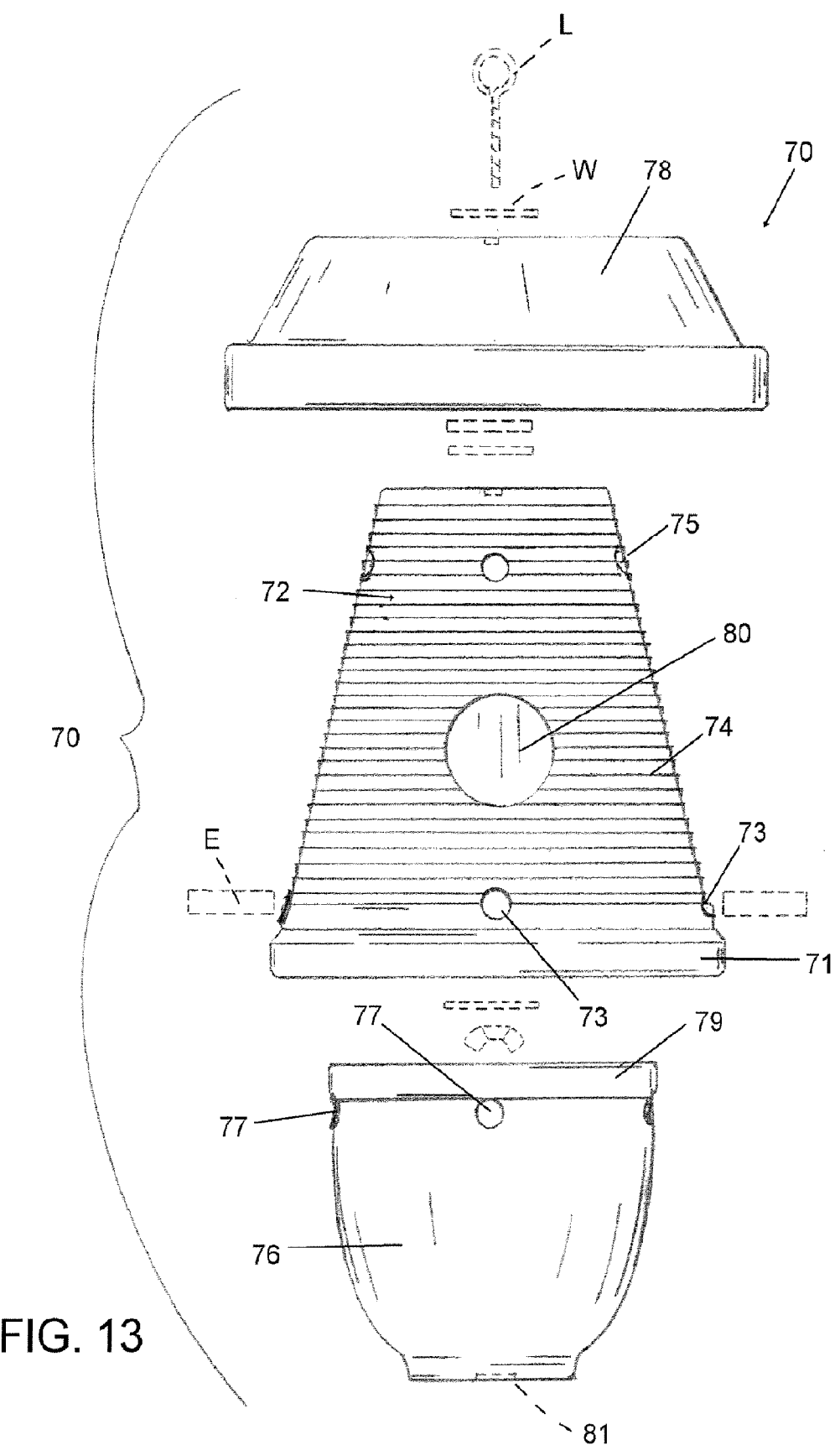
FIG. 13 is an exploded view of the birdhouse of FIG. 12.
Figure 14:
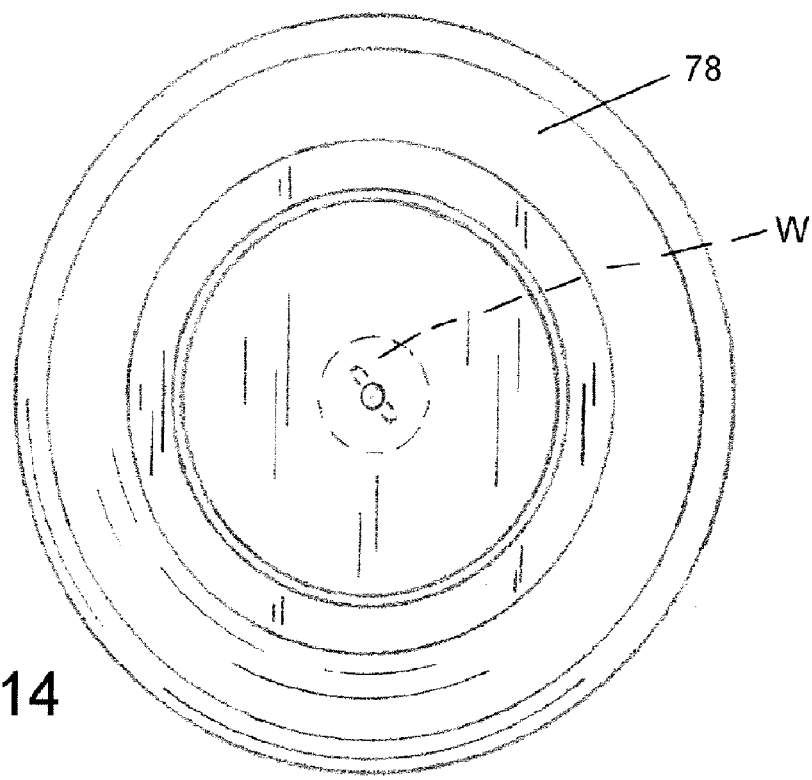
FIG. 14 is a top plan view of the birdhouse of FIG. 12.
Figure 15:
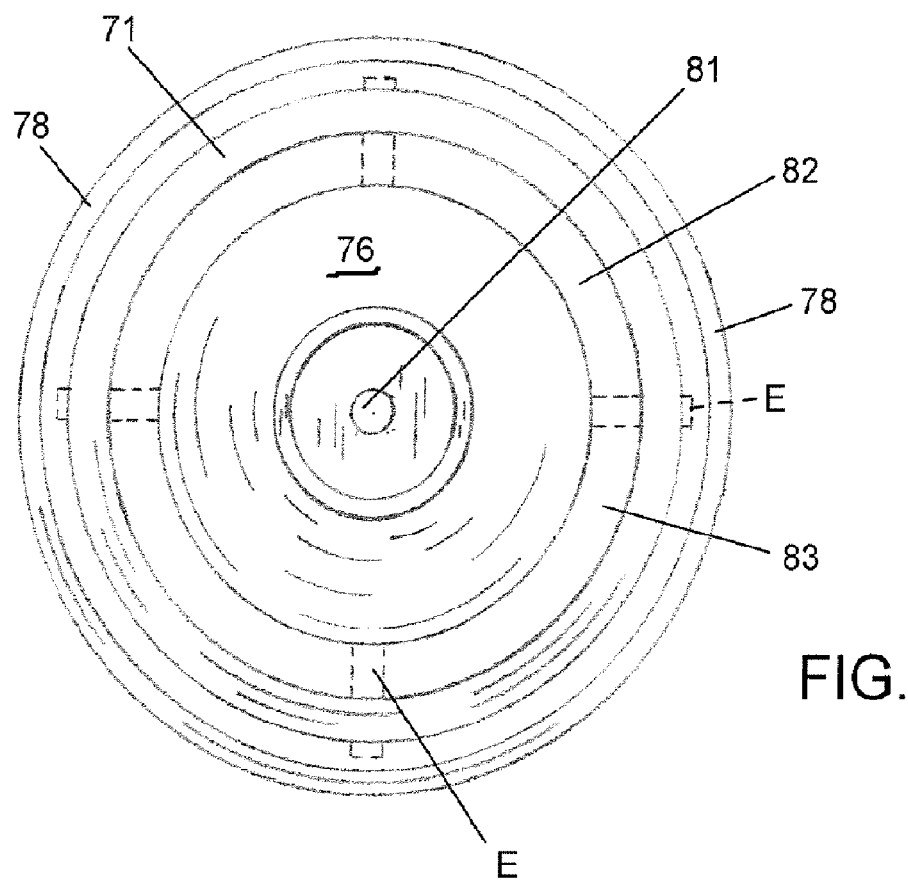
FIG. 15 is a bottom plan view of the birdhouse of FIG. 12.

FIGS. 10 and 11 illustrate another birdhouse embodiment, generally designated 50, which is similar in many respects to birdhouse 30, but which has different dimensions, to better suit different species of birds. Generally speaking, birdhouse 50 is significantly narrower than house 30, of FIGS. 6–9, and is deemed to be better suited for certain birds, other than blue birds, such as chickadees and wrens, for example. House 50 is formed from three distinct ceramic clay flower pots, including a 4 inch diameter rose pot, a "muffin" pot and a saucer. The rose pot is positioned upside down in normal use of the invention and forms the receptacle, generally designated 52. The ceramic muffin pot is the base or floor pot 56 and the saucer forms the top or roof 58. Other than its size and relative dimensions, birdhouse 50 is structured the same as house 30, with the bottom 56 being held to the receptacle rim by dowels E (or other suitable connectors), inserted in aligned holes 53, 57 formed spacedly around the rims of the receptacle 52 and bottom 56. Top 58 is held in place by conventional connectors, such as washers and a threaded bolt and wingnut, as shown in phantom in FIG. 11, for example, just as in the previous embodiment described. The plan views of birdhouse 50 are not shown, because they are the same as those shown for birdhouse 30, only smaller in diameter. As with embodiment 30 air flow is the same in birdhouse 50, and a drain hole 61 is disposed in the floor of house 50 for drainage, and is inherent in the muffin-style flower pot used to form the floor 56.

In keeping with the reduced dimensions of birdhouse 50, the entrance/egress hole 60, defined by wall 52, is only about one inch in diameter. Top 58 is about four and one half inches in diameter, so as to slightly overhang the perimeter of receptacle 52. The entire house, assembled, is about seven inches tall and the diameter of the bottommost surface is about two and one quarter inches, roughly one half the diameter of the bottom of embodiment 30, although approximately the same height.

FIGS. 12–15 show yet another embodiment of the new ceramic clay birdhouse, generally designated 70. Birdhouse 70 is also made from three ceramic clay flowerpots; i.e., a saucer, a "Roman"-style pot and a smaller "bell" pot. The general arrangement of the birdhouse 70 parts is the same as in the second and third birdhouse embodiments discussed above. The main compartment or receptacle 72 is formed from an upside down Roman-style flowerpot, which is placed over an upright bell shaped pot that forms base 76. A roof or top 78 is formed by a clay saucer disposed upside down at the top of the birdhouse 70.

When fully assembled birdhouse 70 is about seven and one half inches tall and has a bottom diameter of about two and one quarter inches. The lower rim of the roof pot 78 has a diameter of about six and one half inches and is provided with spaced-apart through-holes 73 to received pegs E. As in the previous embodiments dowels or pegs E connect rim 71 to the upper rim 79 via holes 77 in rim 79, as illustrated. As in all the embodiments, the pegs only need to be long enough to pass through the holes in both base and receptacle pots. However, if desired, the peg disposed beneath the entrance egress opening 80 may be made longer in order to serve as a perch.

An annular space between rim 71 and rim 79 of birdhouse 70 permits air to flow in and it then flows out through air holes 75 formed around the top of receptacle 72, under the overhang of top 78.

FIGS. 16–20 illustrate one useful embodiment of a bird feeder constructed in accordance with the present invention. Birdfeeder 90 is formed from five ceramic clay flowerpots connected to each other with suitable known fasteners, such as those indicated in phantom, for example. FIG. 17A schematically illustrates the internal relationship of pots 92, 96, 98 and 100 which are assembled to form the preferred construction of feeder 90. Feeder 90 is intended to be used for seed the size of oil sunflower seeds S. It can, however be resized so as to be suitable for other seeds, such as thistle. In any case, however, it is critical that the seed holes be sized appropriately and the distance from the rim to the seed holes be sized correctly for the type of bird which is likely to enjoy the particular seed fed from the feeder. An especially difficult obstacle to overcome in developing the new feeder 90 was to arrive at all the correct dimensions, and to form the holes through the ceramic clay at the correct place in the pot and in the correct shape for the seed. If improperly sized or shaped, the seed cannot be removed by a bird and the feeder will be useless.

In the example shown, the overall assembled dimensions are: about eight and one-quarter inches high, the top having a diameter of approximately seven and one-half inches and the bottom tray being about eight and one-quarter inches in diameter.

As with the other ceramic clay birdhouse accessories described above, in feeder 90 there is a main receptacle 92 having a sloped, cylindrical side wall 94. In this case, the pot forming the receptacle is disposed right side up (with respect to the conventional flower pot use position) and the side wall does not have a single opening for entrance of a bird, but rather has several smaller openings 93 spaced apart from one another around the wall to permit birds to remove seeds in the feeder therethrough. In the embodiment illustrated seed removal openings 93 are each positioned with the bottommost end thereof about one and one half inches from the bottom of receptacle pot 92. A similar feeder can be provided for use with thistle seeds, for example, in which case the openings would be significantly smaller than those shown and described for this embodiment, and would be positioned closer to the rim of the bottom tray 96.

Figure 19:
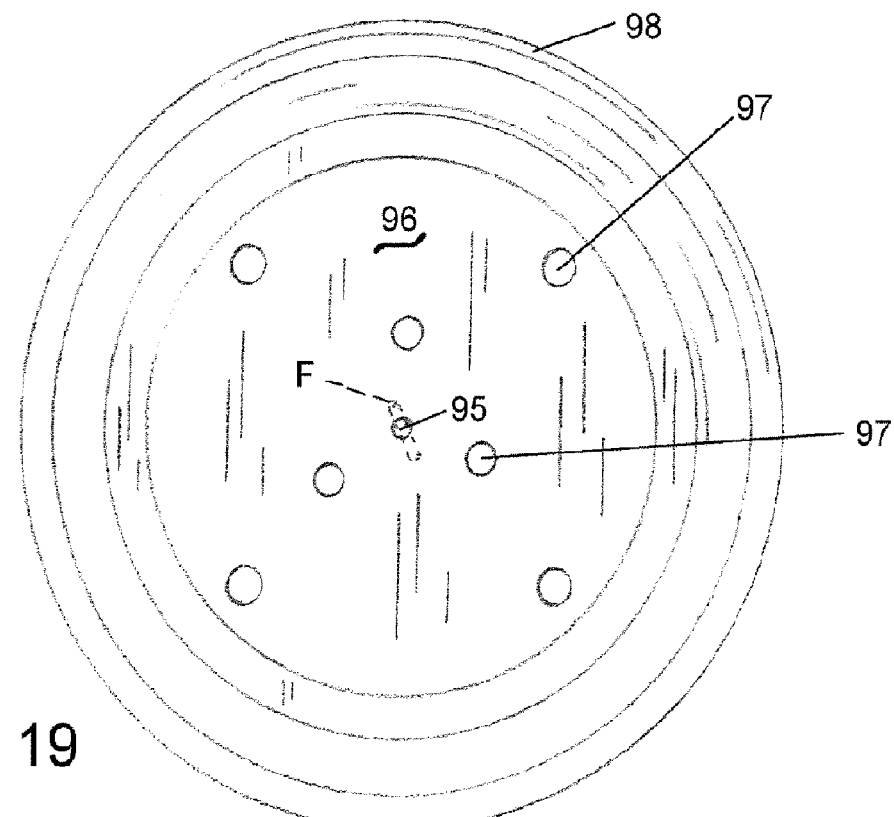
FIG. 19 is a bottom plan view of the bird feeder of FIG. 16.
Figure 20:
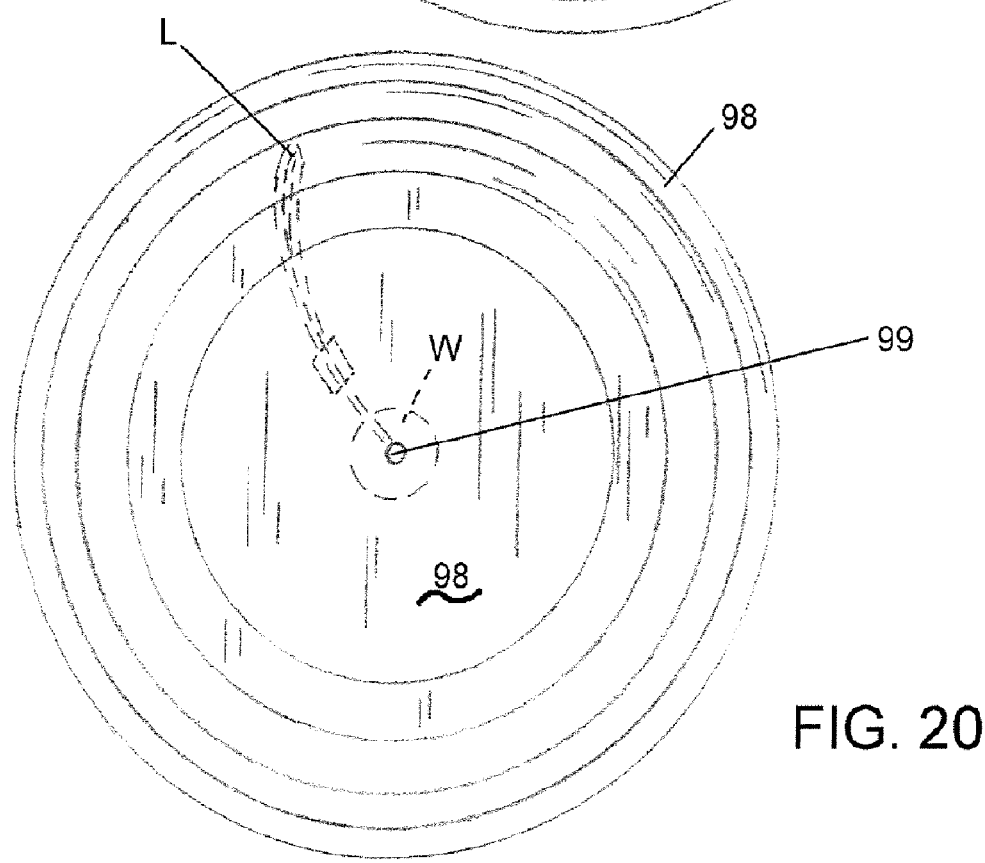
FIG. 20 is a top plan view of the bird feeder of FIG. 16.

A base pot 96 is formed from a ceramic clay flower pot saucer and is provided with a plurality of drainage holes 97 spaced apart about the plane of the floor of saucer 96, as shown in FIG. 19, so that water does not collect in the pot and ruin seeds which fall from holes 93 into pot 96. While birdfeeder 90 is preferred with such a base plate saucer 96, for the above reasons, and to provide a perch for feeding birds, it could function without any base plate. In that case, excess seed would be wasted by falling to the ground, but a perch could be provided near each seed opening.

Figure 16:
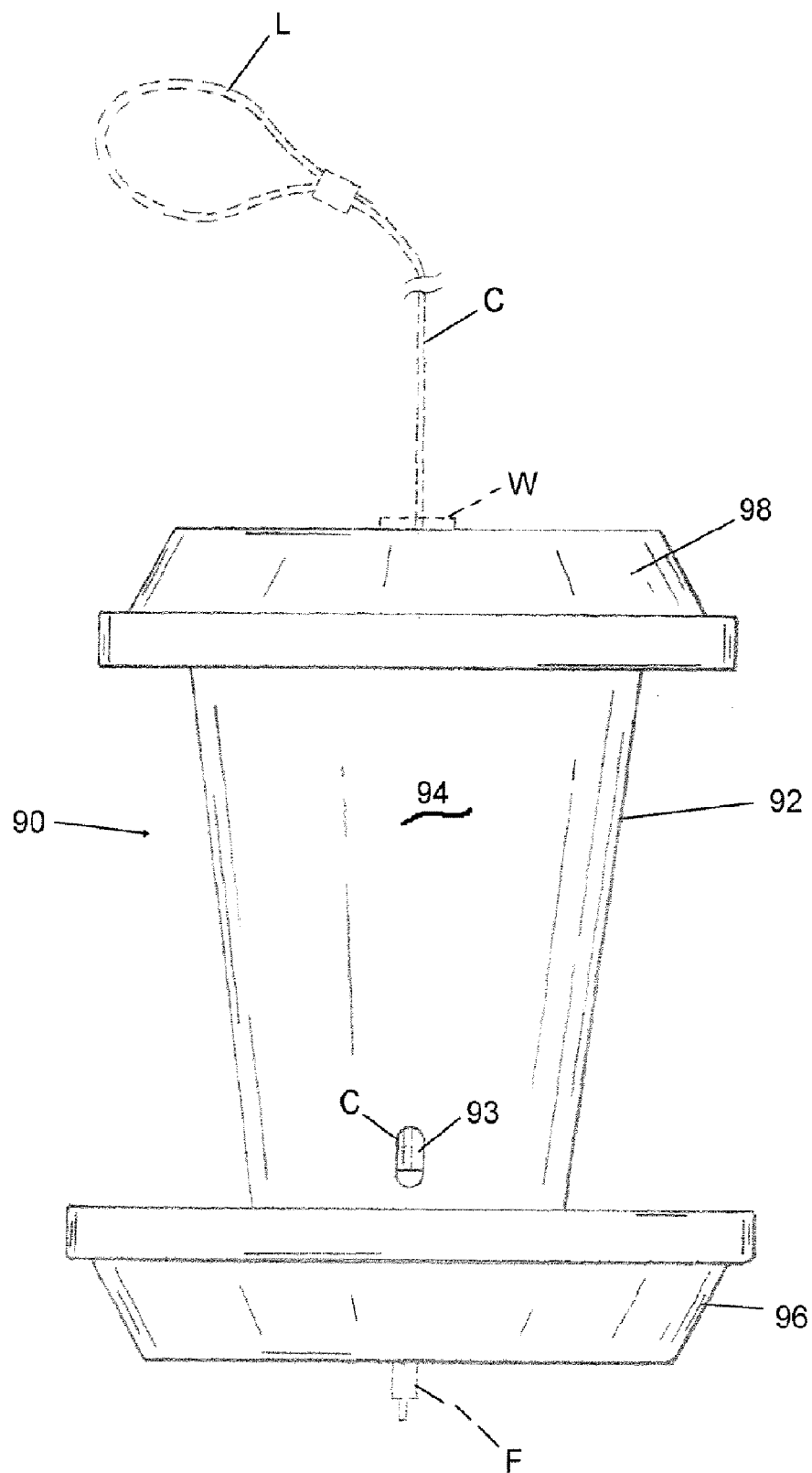
FIG. 16 is a front elevational view of a bird feeder in accordance with the invention.
Figure 17:
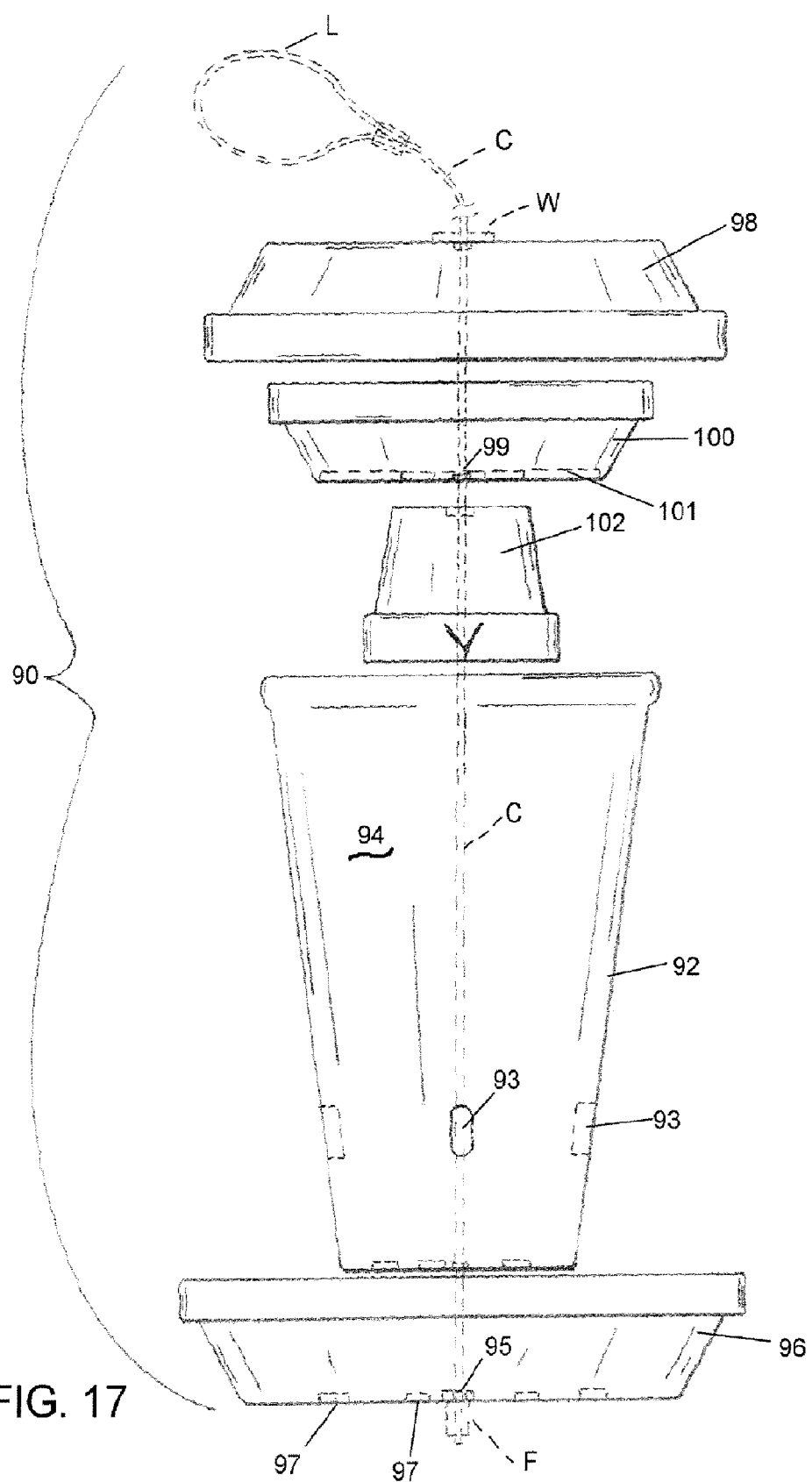
FIG. 17 is an exploded view of the bird feeder of FIG. 16.
Figure 17A:
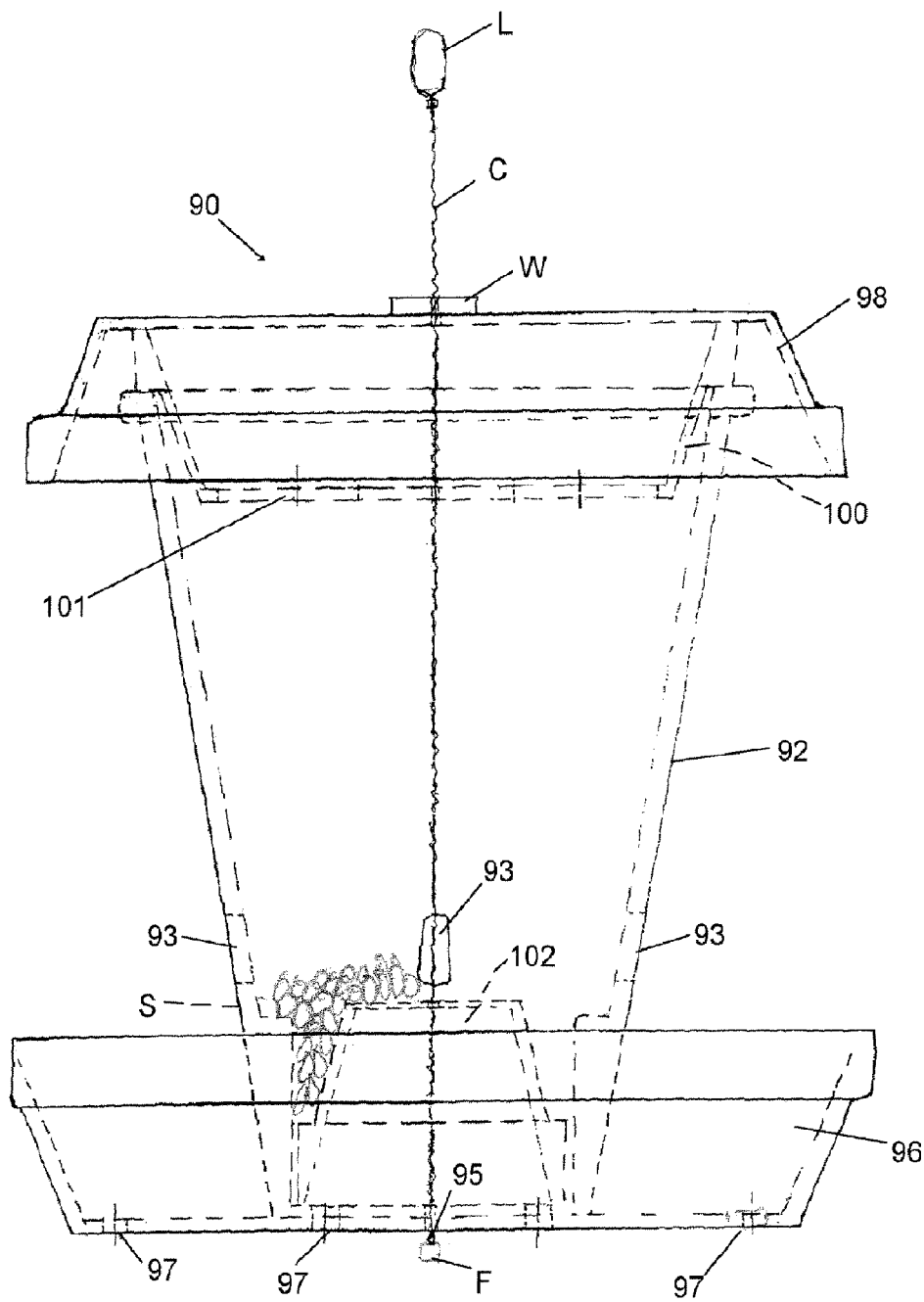
FIG. 17A is a schematic enlarged view of the bird feeder of FIG. 16, showing the internal relationship of the various elements thereof.

The top 98 of birdfeeder 90 is formed from another ceramic clay flower pot saucer turned upside down over main receptacle pot 92, as illustrated in FIGS. 16, 17 and 17A. Top 98 is provided with a small central through-hole 99 through which cable C is passed. FIGS. 17 and 17A most clearly show that cable C extends, in this case, through aperture 95, vertically through all pots of feeder 92, and beneath base plate 96, where it is retained by a fastener F, and upwardly out of through-hole 99. Cable C terminates spacedly above the top of feeder 90, preferably in a loop L, by which feeder 90 can be suspended from a tree or hook (not seen).

Figure 18:
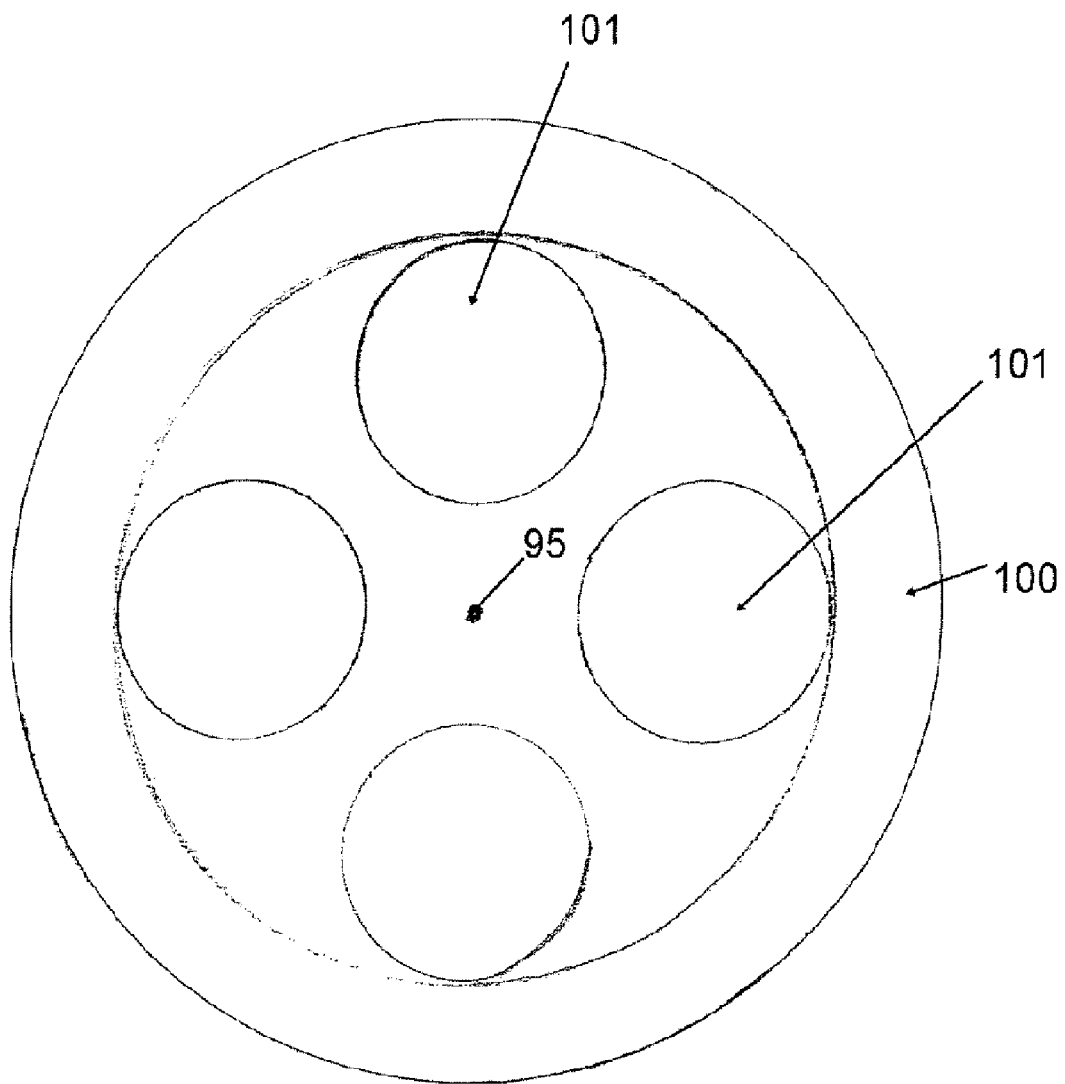
FIG. 18 is a schematic, plan view of the bottom of an internal saucer of the bird feeder of FIG. 16.

Beneath top plate 98 there is disposed another flowerpot saucer 100, positioned upright inside of the upper end of receptacle 92. A schematic plan view of saucer 100 is shown in FIG. 18 for clarity. The clay flower pot saucer from which plate 100 is formed is modified to have a plurality of large holes 101, about one and one-half inches in diameter, and preferably four of them, formed through the bottom plane of the saucer and spaced about, as shown, for example. A small through-hole is also provided to channel cable C therethrough for sliding fit of saucer 100 within the top of pot 92. However, if preferred, plate 100 could be attached within receptacle 92 in a manner, which did not permit movement between the two pieces. In this manner, top 98 can slide on cable C and be lifted from the tope of receptacle 92, while the presence of saucer 100 within the top of pot 92, but with the central stabilizing presence of cable C maintains feeder 90 in an upright position. Without saucer 100 in the position shown and described, when top 98 is lifted from receptacle 92 to fill feeder 90 with seed the receptacle pot would tip to cable C and possibly cause seed spillage. When saucer 100 is constructed as shown the large openings 101 permit ready passage therethrough of the largest of bird seeds, while still permitting the pot as a whole to stay upright for easy filling thereof.

At the bottom of feeder 90, inside of receptacle pot 92 there is preferably another small inverted flower pot 102. As shown in FIG. 17A, pot 102 fits handily into the inside diameter of pot 92 and serves to keep seed in receptacle 92 spaced up off the bottom surface where it could come into contact with moisture. Internal pot 102 also maintains the bottom level of the seed near the seed access openings 93.

In the embodiment shown, the preferred dimensions are as follows, although other sizes can be useful, particularly if the dimensions of the various parts relative to each other are maintained. In this case, receptacle pot 92 has an uppermost diameter of approximately six inches and a height of about seven and one-half inches. Seed openings 93 are about 1.8 inches from the bottom of receptacle 92 and about one quarter inch wide at the top, tapering out and down to about one third of an inch at the bottom. Drain holes 97 are about one quarter inch in diameter and the cable openings are all about at least one sixteenth inch in diameter. Of course a larger cable can be used if larger cable openings are provided. A washer W is mounted on cable C at the top, exterior of feeder 90 to prevent water seeping into the pots.

Internal pot 102 (e.g. an "azalea pot") is about 1.8 inches tall and about 2.5 inches in diameter at its widest point. Internal saucer 100 is about five and three-quarters inches at its top diameter and about four and one-half inches at the bottom diameter, and about one and one-half inches high. These dimensions are considered typical of the type saucer referred to in the industry as a "5 and one-half inch red clay saucer". In this case of course the typical saucer has been modified with the specific holes and purpose described. Top 98 is a standard 7½ inches red clay saucer, inverted. Like all the birdhouses described above, feeder 90 is critically formed with all major structural components being ceramic clay flower pots.

In all embodiments shown and described above of the new wild bird accessories, it is preferred that the clay parts be treated with silicone or other suitable, non-toxic water sealant. It is further to be understood that in each of the embodiments discussed above specifics described in detail with reference to one embodiment may, where apparent, also be attributed to other embodiments, but are not enumerated, for simplicity and clarity of the specification.

Although the foregoing includes a description of the best mode contemplated for carrying out the invention, various modifications are contemplated. As various modifications could be made in the constructions and methods herein described and illustrated without departing from the scope of the invention, it is intended that all matter contained in the foregoing description or shown in the accompanying drawings shall be interpreted as illustrative rather than limiting.

What is claimed is:

1. A feeding apparatus for wild birds formed from a plurality of ceramic clay flowerpots disposed in preselected relation to each other, the feeding apparatus comprising:
   a receptacle formed from a first ceramic clay flowerpot, the receptacle defining an interior and having a first end, a second end and a continuous side wall of the receptacle extending between the first end and the second end of the receptacle, the continuous side wall having a plurality of through openings of preselected sizes disposed at preselected positions;
   a top formed of a second ceramic clay flowerpot positioned coaxially and adjacent to the first end of the receptacle and opening downwardly, said second flowerpot being connected to the first flowerpot; and
   at least one third ceramic clay flowerpot inside at least a portion of the interior of the receptacle forming the feeding apparatus.

2. A feeding apparatus according to claim 1, wherein at least some of the through openings are disposed, spaced apart from one another, around the perimeter of the receptacle and serve to enhance airflow through the feeding apparatus.

3. A feeding apparatus according to claim 1, wherein the top is disposed in position for normal use of the feeding apparatus at the first end of the receptacle to provide a cover for the feeding apparatus.

4. A feeding apparatus according to claim 3, wherein the top includes a ceramic clay flowerpot saucer inverted over the first end of the receptacle.

5. A feeding apparatus according to claim 1, wherein the third ceramic clay flowerpot inside of the receptacle is disposed interior at the first end of the receptacle, right-side up, and has a bottom surface with a plurality of through openings disposed spaced-apart from one another and of sufficient size to permit facile flow-through of bird seed.

6. A feeding apparatus according to claim 1, wherein the third ceramic clay flowerpot inside of the receptacle is disposed at the second end of the receptacle, up-side down, to thereby prevent bird seed in the receptacle from settling onto an interior bottom surface of the receptacle where the bird seed could become wet.

7. A feeding apparatus according to claim 1, further comprising a base formed of a fourth ceramic clay flowerpot positioned coaxially and adjacent to the second end of the receptacle and opening upwardly, the base having at least one drainage hole.

8. A feeding apparatus according to claim 7, further comprising an intermediate plate formed of a fifth ceramic clay flowerpot positioned between the second end of the receptacle and the top and connected to the second end of the receptacle, the intermediate plate having a plurality of through holes.

* * * * *